United States Patent
Ho et al.

(10) Patent No.: US 7,423,891 B2
(45) Date of Patent: Sep. 9, 2008

(54) INVERTER DEVICE UTILIZING THREE SWITCHES CONTROLLED IN A CONCURRENT MANNER IN A RESONANT TRANSFORMER

(75) Inventors: Kwok-Pun Ho, Hung Hom (HK); Mansing Tse, Shatin (HK)

(73) Assignee: PI International Ltd., Tortola (VG)

( * ) Notice: Subject to any disclaimer, the term of this patent is extended or adjusted under 35 U.S.C. 154(b) by 0 days.

(21) Appl. No.: 11/125,232

(22) Filed: May 10, 2005

(65) Prior Publication Data

US 2006/0256598 A1    Nov. 16, 2006

(51) Int. Cl.
*H02M 3/335* (2006.01)
*H02M 3/24* (2006.01)
*H02M 5/42* (2006.01)

(52) U.S. Cl. .............................. 363/26; 363/24; 363/98; 363/134

(58) Field of Classification Search .................. 363/24, 363/25, 26, 98, 134, 133
See application file for complete search history.

(56) References Cited

U.S. PATENT DOCUMENTS

| | | | | |
|---|---|---|---|---|
| 5,825,133 A * | 10/1998 | Conway | ...................... | 315/105 |
| 5,896,280 A * | 4/1999 | Gucyski et al. | ............... | 363/24 |
| 6,876,157 B2 * | 4/2005 | Henry | .......................... | 315/219 |
| 7,046,526 B2 * | 5/2006 | Toda et al. | .................... | 363/24 |
| 7,064,497 B1 * | 6/2006 | Hsieh | .......................... | 315/246 |

* cited by examiner

*Primary Examiner*—Bao Q Vu
(74) *Attorney, Agent, or Firm*—Rosenberg, Klein & Lee

(57) ABSTRACT

Described is an inverter device suitable for driving a cold cathode fluorescent lamp (CCFL), comprising a transformer having a primary winding and a secondary winding. The primary winding has two terminals connected to a return-path terminal of a direct current (DC) power source through a second switch and a third switch, respectively, and a center tap connected to an output of the DC power source through a first switch. A signal controlling unit is further included to control the switches in such a manner that the second and third switches are on concurrently or alternatively in cooperation with the first switch. As such, an alternating current (AC) power is fed to the primary winding of the transformer and an output of the transformer is supplied to the CCFL.

6 Claims, 5 Drawing Sheets

INVERTER DEVICE UTILIZING THREE SWITCHES CONTROLLED IN A CONCURRENT MANNER IN A RESONANT TRANSFORMER

BACKGROUND OF THE INVENTION

1. Field of the Invention

The present invention relates to an inverter device capable of supplying an alternating current (AC) power to a cold cathode fluorescent lamp (CCFL).

2. Description of Related Art

In a thin film transistor (TFT) LCD or other LCD display panel, a power supplied to a backlight source therein is mainly for allowing an inverter circuit to achieve energy conversion and a cold cathode fluorescent lamp (CCFL) to achieve light emitting. According to circuit topologies, the prior inverter circuits used to converse a direct current (DC) power into an alternating current (AC) power are generally categorized into half-bridge inverter circuits, full-bridge inverter circuits, Clark converters and the like.

Referring to FIG. 1, a schematic diagram of the prior Clark converter circuit is depicted therein. As shown in FIG. 1, the Clark converter comprises a transformer 401 having a center tap connected to a positive terminal of a DC power 408 through an inductor 403. Meanwhile, two input terminals of the transformer 401 are connected to a negative terminal of the DC power source 408 through switches 405,406, respectively. In the Clark converter circuit, it is operated based on the following principle. A control unit 407 is provided to control the switches 405,406 alternatively. Based on the switching operations of the switches 405,406, the DC power source 408 may transmit a DC power to the transformer 401 through the inductor 403, in which the DC power transmitted is conversed by means of the transformer 401 to provide a desired DC power for use of the CCFL to emit a light.

In the above, the switches 405,406 may also be switched by a self-excited driving manner. Further, an outputted power of the Clark converter circuit vanes with the inputted DC power since the circuit itself does not provide any power regulation function with respect to the outputted power.

Referring to FIG. 2, a schematic circuit diagram of the prior full-bridge converter is depicted therein. In the circuit, a transformer 501 is provided and a former-stage circuit at a primary side thereof and a latter circuit-stage at a secondary side thereof are separated by the transformer 501. The former-stage circuit at the primary side comprises four switches 503,504,505,506, a full-bridge control module 509, a DC block capacitor 510 and the like. The latter-stage circuit at the secondary side comprises a load. The full-bridge control module 509 outputs four control signals to control four switches (503,504,505,506), respectively, so that the DC power source 507 supplies a voltage to the transformer 501 through a capacitor 510. Further, the voltage outputted from the transformer 501 is boosted at the secondary winding and inputted to the former-stage circuit corresponding thereto in such a manner that the load is properly driven. In this full-bridge converter circuit, the drive stage for the switches 503, 505 at the high voltage side of the transformer 501 has to be provided with a voltage shift circuit. However, such voltage shift circuit introduces an additional transmission delay, making different of its timings compared with those of the switches 504,506 at the low voltage side of the transformer 501. As such, a non-symmetric input voltage V1 is generated, resulting in magnetic saturation of the transformer 501. To prevent the magnetic saturation, a DC block capacitor 510 is generally connected at the primary side of the transformer 501.

SUMMARY OF THE INVENTION

It is, therefore, an object of the present invention to provide an inverter device without magnetic saturation occurred in a transformer therein.

In the inverter device according to the present invention, two input terminals of the transformer at a primary side are connected to a return-path terminal of a direct current (DC) power source through a second switch and a third switch. Further, a center tap at the primary side of the transformer is connected to an output of the DC power source through a first switch. The inverter device further comprises a signal controlling unit for controlling the switches so that the second and third switches turn on concurrently or alternatively in cooperation with the first switch. As such, an alternating current (AC) power is fed to a primary winding at the primary side of the transformer and then a secondary winding at a secondary side of the transformer outputs a conversed AC power to a load.

Based on the inverter device arrangement, the signal controlling unit controls periodically the switches in the following manner. In a cycle, the second and third switches are on concurrently while the first switch is off so that a zero voltage difference and short circuit is generated between the two inputs at the primary side of the transformer. Then, the first switch and the third switch are on concurrently while the second switch is off so that between the two inputs of the transformer is fed with a positive voltage bias supplied from the DC power source. Next, the second and third switches are on concurrently while the first switch is cut again. Then, the first and second switches are on concurrently while the third switch is off again so that between the two inputs of the transformer is fed with a negative voltage bias supplied from the DC power source. By means of execution of such cycle periodically, the AC power having voltage amplitude equal to that of the DC power is obtained between the two inputs of the transformer at the primary side. Then, a conversed AC power is supplied to the load through the secondary winding of the transformer.

Therefore, only three switches are required in realization of the inverter device supplying an AC power to the load without the need of a complex circuit. Meanwhile, a highly symmetric AC power may be obtained so that a non-symmetric input voltage wave does not generate at the primary side of the transformer and thus the transformer may be exempted from magnetic saturation, eliminating the use of a DC block capacitor at the primary side of the transformer.

To enable those skilled in the art to further understand the present invention, the present invention will be described in more detail below with reference to the preferred embodiments in connection with the accompanying drawings.

DETAILED DESCRIPTION OF PREFERRED EMBODIMENTS

Figure 1:
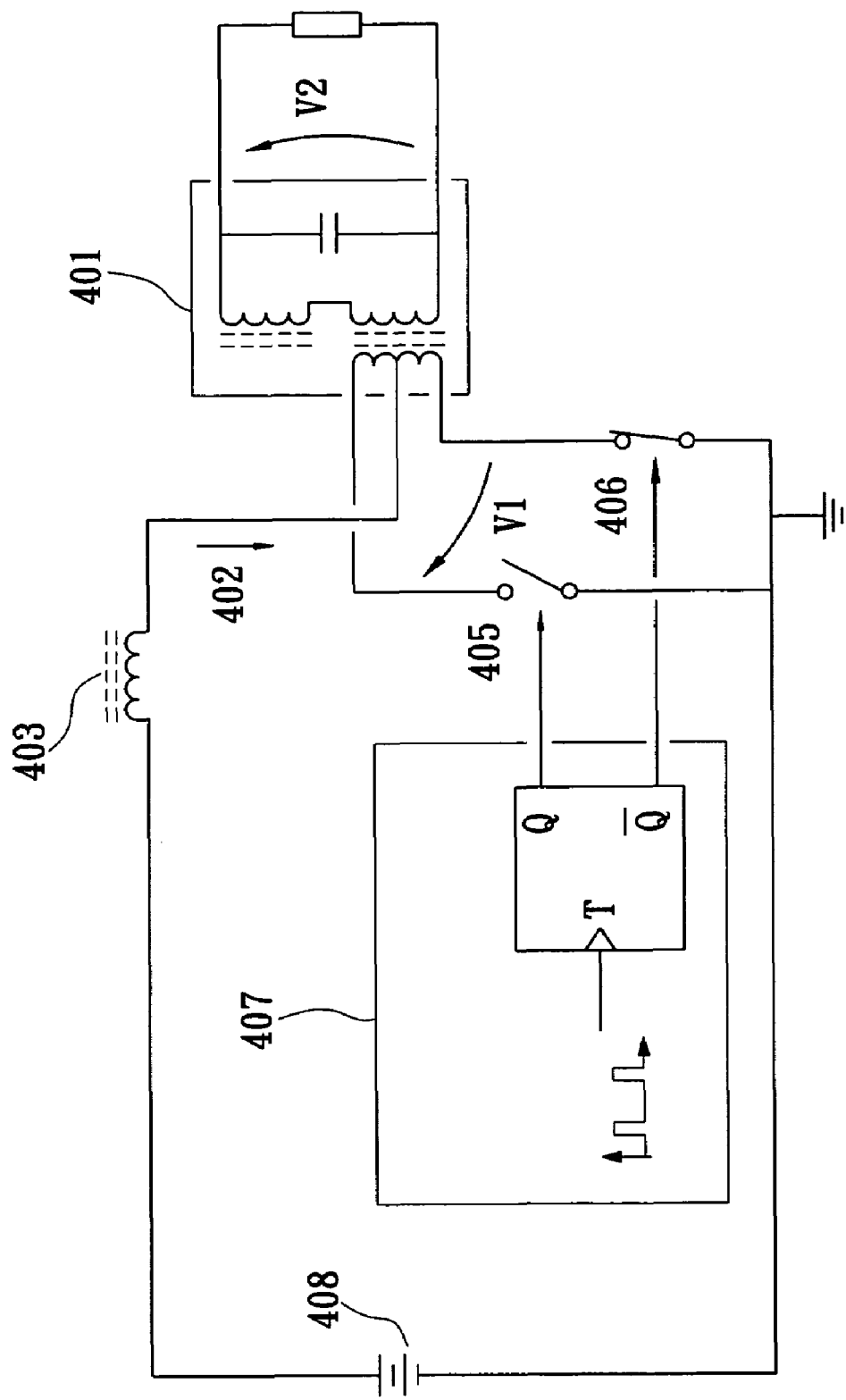
FIG. 1 is a schematic diagram of a prior Clark converter.
Figure 2:
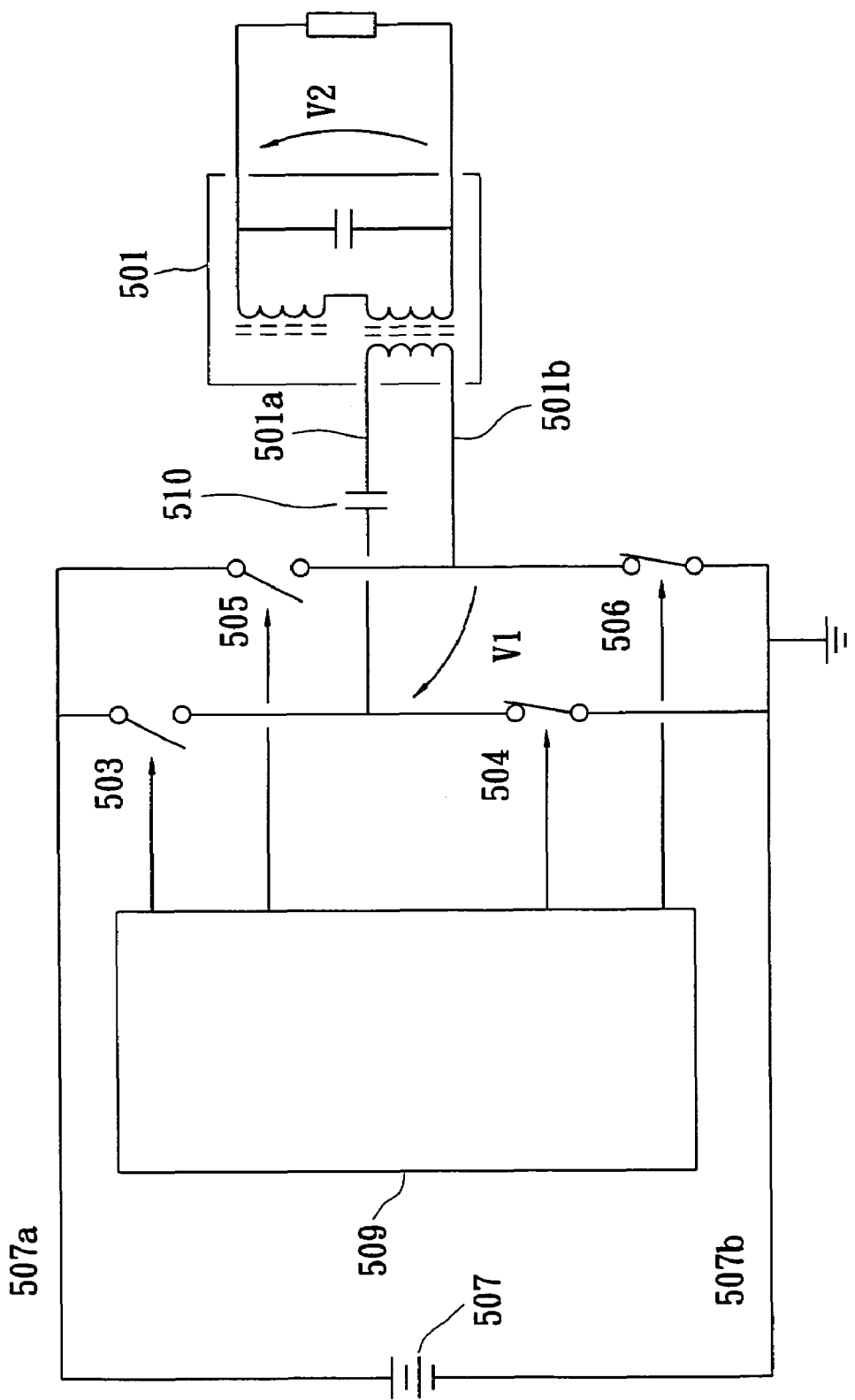
FIG. 2 is a schematic diagram of a prior full bridge converter.
Figure 3:
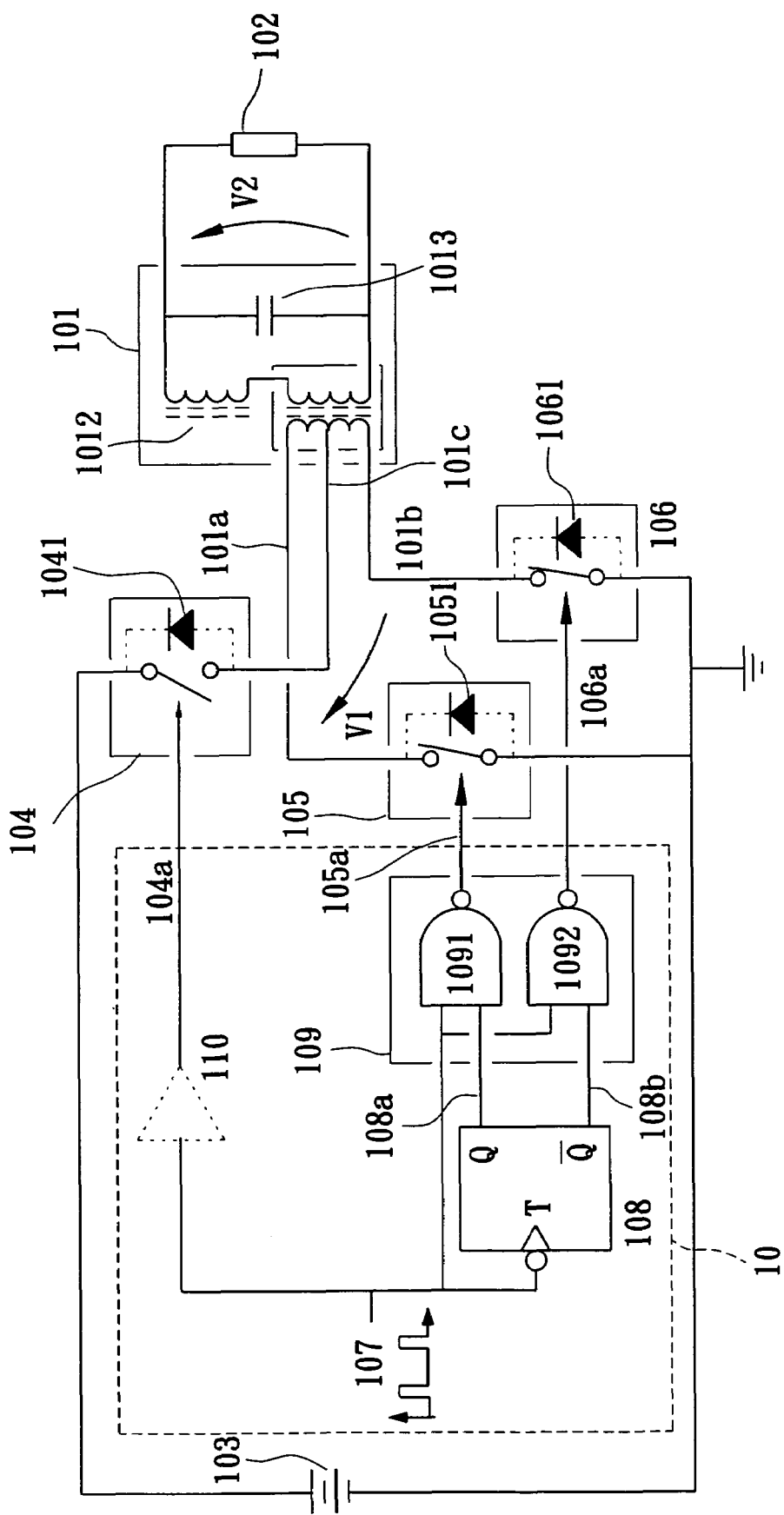
FIG. 3 is a circuit diagram of an inverter device according to the present invention.

Referring to FIG. 3, an inverter device according to the present invention is depicted therein, comprising a direct current (DC) power source 103 having an output terminal and a return-path terminal, and a transformer having a primary winding having two input terminals and a center tap 101c and a secondary winding. In the transformer 101, the center tap 101 is connected to the output terminal of the DC power 103 through a first switch 104. The second input terminal is connected to the return-path terminal through a second switch 105 and a third switch 106, respectively.

To control the three switches 104,105,106, a signal controlling unit 10 is provided to output three control signals for controlling the second switch 105 and the third switch 106 to be on concurrently or alternatively. In cooperation with the first switch 104 also controlled by the signal controlling unit 10, the second and third switches 105,106 provide an AC power to the primary winding of the transformer 101 when being on. As such, the secondary winding outputs a conversed AC power to a load 102.

Referring again to FIG. 3, the signal controlling unit 10 uses a PWM signal 107 to control the first switch 104. The PWM signal 107 also sends a PWM signal to a flip-flop 108 having an input terminal T and two output terminals Q and $\overline{Q}$. Responsive to the PWM signal, the output terminals Q and $\overline{Q}$ of the flip-flop 108 output two complemented signals 108a, 108b, respectively. A logic circuit 109 made up of two NAND gates 1091,1092 is provided. An input terminal of each of the two NAND gates 1091,1092 is connected to the two outputs Q and $\overline{Q}$ of the flip-flop 108, while the other input terminal receives the PWM signal 107. An output terminal of each of the two NAND gates 1091,1092 output control signals 105a, 106a, respectively, to control the second switch 105 and the third switch 106. Based on control characteristics of the switches 105,106, each of the NAND gates 1091,1092 may be replaced with an AND gate.

In the above description, the flip-flop 108 is a T-flip-flop and the T-flip-flop may be made up of a D-flip-flop, a SR-flip-flop or a JK-flip-flop. Meanwhile, the PWM signal 107 further sends a control signal 104a to the first switch 104 through an inverting buffer 110 to control the first switch 104.

Referring again to FIG. 3, the signal controlling unit 10 controls the switches 104,105,106 in a periodical manner and the switches 104,105,106 are controlled as having the following operations. The second and third switches 105,106 are on concurrently while the first switch 104 is off, resulting in short circuit between the two input terminals 101a, 101b of the transformer 101 at the primary side. Next, the first and third switches 104,106 are on while the second switch 105 is off, causing a positive DC power provided by the DC power source 103 being transmitted to the two input terminals 101c, 101b at the primary side. As such, the positive voltage is induced to present between the two input terminals 101a, 101b. Next, the cycle in which the second and third switches 105,106 are on concurrently while the first switch 104 is off repeats. Then, the first and second switches 104,105 are on concurrently while the third switch 106 is off, causing a negative DC power provided from the DC power source 103 being transmitted to the two input terminals 101a, 101c at the primary side. As such, the negative voltage is induced to present between the two input terminals 101a, 101b. of the transformer 501.

Based on the described periodical switching operations, an AC power having an amplitude two times the DC power supplied from the DC power source 104 is obtained between the two input terminals 101a, 101b. Further, the secondary winding of the transformer 101 has a leakage inductance 1012 forming an in-series resonance effect with a resonance capacitor 1013. By means of the in-series resonance effect, the transformer 101 converses the AC power into a sine waved AC power at the secondary side and then outputs the sine waved AC power to the load 102.

Also referring to FIG. 3, each of the first, second and third switches 104,105,106 has a parasitic diode designated as 1041,1051,1061, respectively. Each of the parasitic diodes 1041,1051,1061 may provide a return path for a fly-back current to circulate or to flow to the DC power 103, and the return paths have no direct relation with respect to the control signal.

Figure 4:
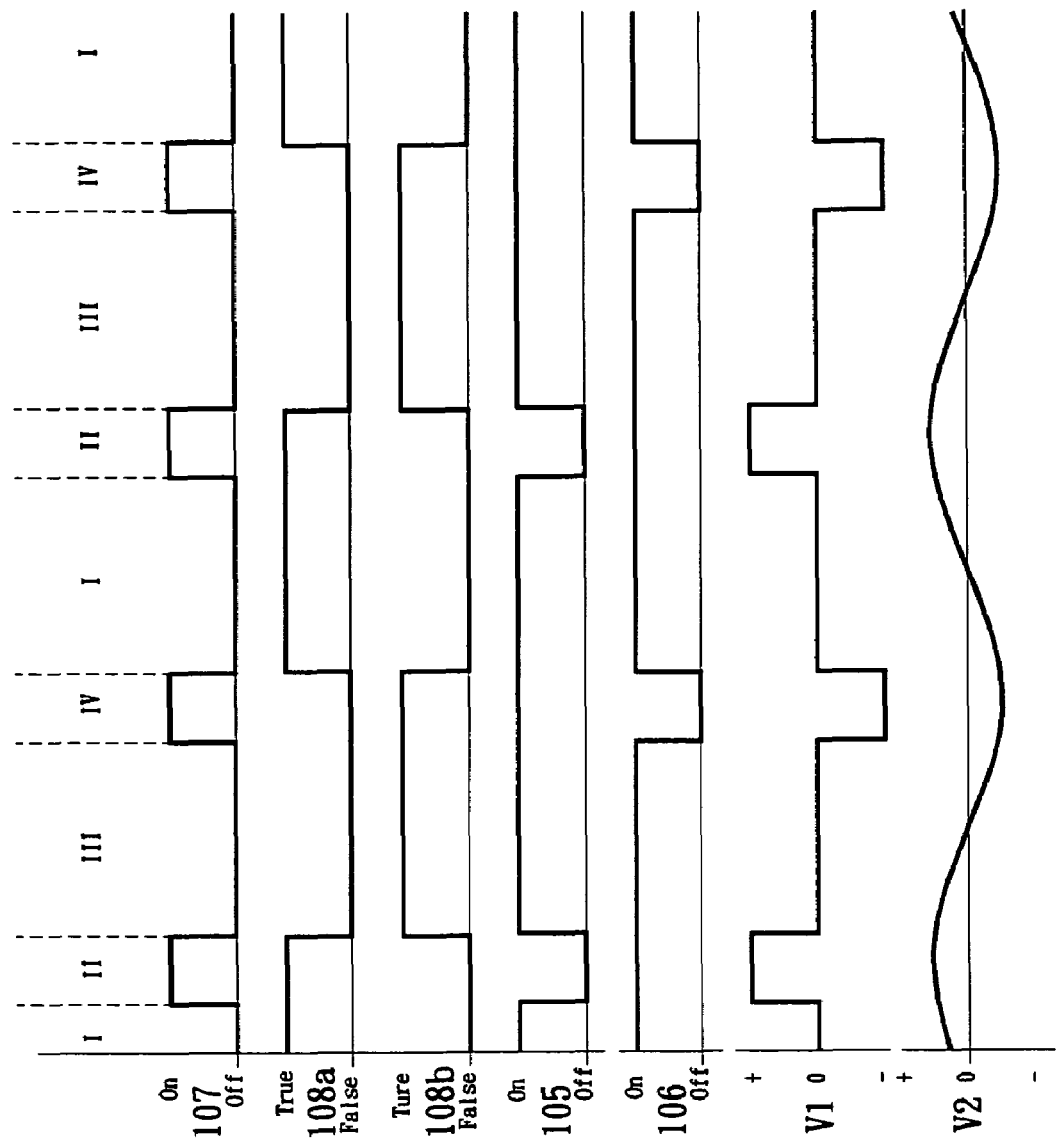
FIG. 4 is a voltage wave plot of components of the inverter device when a PWM signal having a duration of less than 50% is provided according to the present invention.

Referring to FIG. 4 with also reference to FIG. 4, a voltage wave plot of the components of the inverter device when a PWM signal having a duration less than 50% is provided is depicted therein. As shown in FIG. 4, the PWM signal 107 is logic low during period I and used to control the first switch 104 to be off, while the two complemented signals 108a, 108b are remained the same. At this time, the logic circuit 109 outputs two control signals to control the second switch 105 and the third switch 106 to be on, based on the low-level PWM signal 107, the high level signal 108a and the low-level signal 108b. As such, between the two input terminals 101a, 101b of the transformer 101 at the primary side are zero in voltage.

During Period II, the PWM signal 107 is logic high and used to control the first switch 104 to be on while the two complemented signals 108a, 108b are remained the same. At this time, the logic circuit 109 outputs two control signals to control the second switch 105 to be off and the third switch 106 to be on, respectively, based on the high-level PWM signal 107, the high level signal 108a and the low-level signal 108b. As such, a positive voltage is obtained between the two input terminals 101a, 101b of the transformer 101 at the primary side.

During period III, the PWM signal 107 has a state transition from the high level to the low level through which the first switch is controlled to be off. At this time, both the two complemented signals 108a, 108b have state transitions (i.e. the signal 108a is from logic high to logic low and the signal 108b from logic low to logic high). At this time, the logic circuit 109 outputs two control signals to control the second switch 105 and the third switch 106 to be both on, based on the low-level PWM signal 107, the low-level signal 108a and the high-level signal 108b. As such, between the two input terminals 101a, 101b of the transformer 101 at the primary side are a zero voltage again.

During period IV, the PWM signal 107 is transitioned in state from logic low to logic high through which the first switch 104 is control to be on again, while the two complemented signals 108a, 108b are remained the same. At this time, the logic circuit 109 outputs two control signals to control the second switch 105 to be on and the third switch 106 to be off, respectively, based on the high-level PWM signal 107, the low-level signal 108a and the high-level signal 108b. As such, a negative voltage is obtained between the two input terminals 101a, 101b of the transformer 101 at the primary side.

In the above description, the duration of less than 50% is adopted for the PWM signal 107 in controlling the switches 104, 105, 106 in a periodical manner. Hence, after period IV the voltage waves of the components of the inverter device are restored back to those within period I and operations of the components are also the same as compared to the latter case. By means of repetition of such cycle, a symmetric input voltage V1 is generated between the two inputs 101a, 101b of the transformer 101 at the primary side. By means of the LC in-series resonance effect of the transformer 101, the input voltage V1 is conversed to a sine waved output voltage V2 for the load 102 connected to the secondary winding of the transformer 101.

Figure 5:
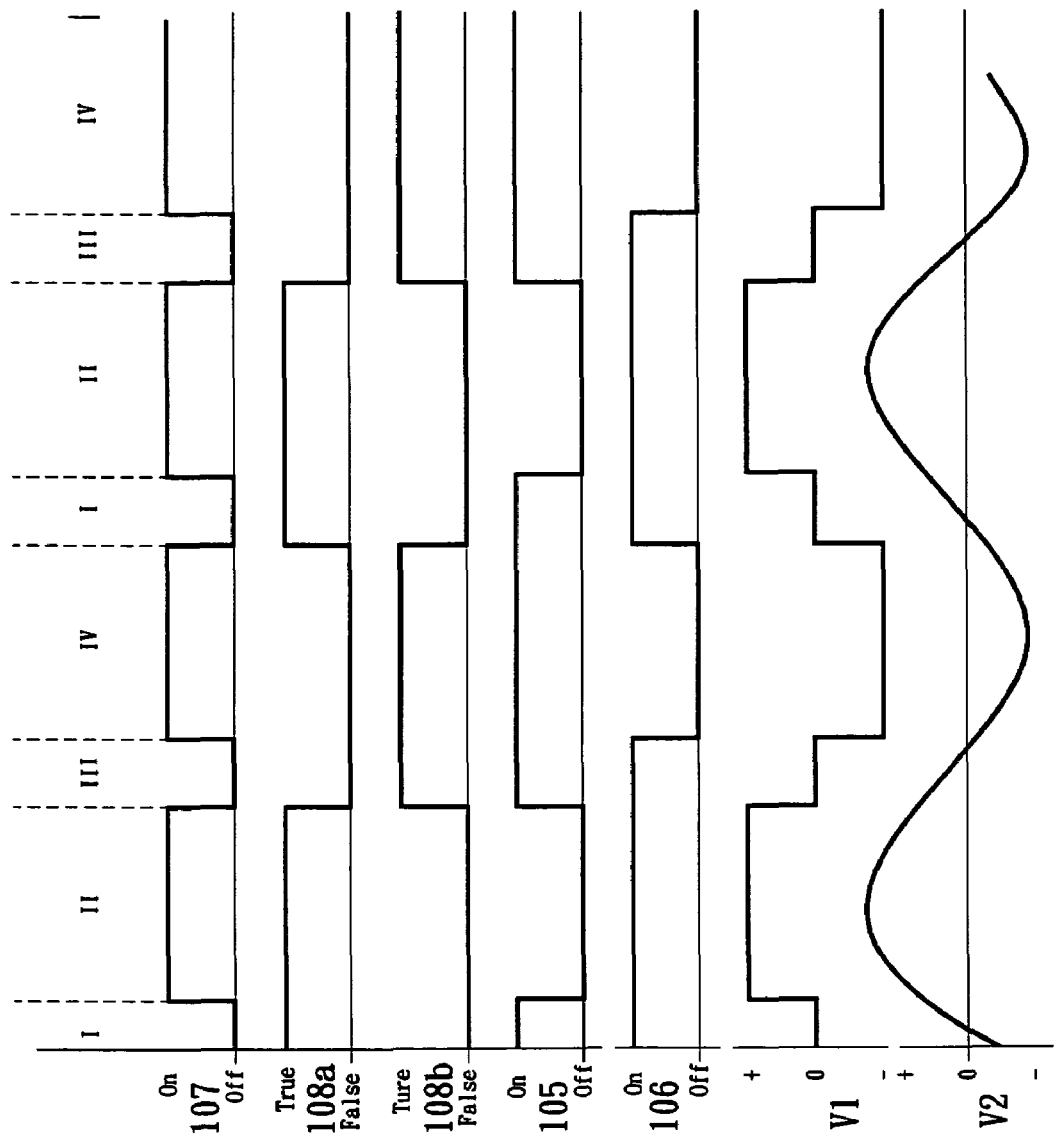
FIG. 5 is a voltage wave plot of the components of the inverter device when a PWM signal having a duration of greater than 50% is provided according to the present invention.

Referring to FIG. 5, a voltage wave plot of the components of the inverter circuit when the PWM signal has a duration of greater than 50% is provided therein. In operation principle, the waves in FIG. 5 are the same as those in FIG. 4 and will not be explained again. However, the input voltage V1 generated between the two input terminal 101a, 101b of the transformer 101 at the primary side in the latter case shown in FIG. 5 are maintained in a longer period in period II and IV and correspondingly maintained in a shorter period in period I and period III, compared with the former case shown in FIG. 4. As such, the input voltage V1 is conversed to a sine waved output voltage V2 having a larger amplitude by means of the LC in-series resonance effect of the transformer 101 and the sine waved output voltage V2 is supplied to the load 102 of the transformer 101 at the secondary side.

In conclusion, only three switches are required in the inventive inverter device for achieving the current conversion to provide an AC power to the load without the need of a complex circuit. Meanwhile, since the positive and negative cycles of the switches are controlled to be perfectly symmetric, a highly symmetric periodic AC power is provided in this invention and thus the non-symmetric input voltage wave at the primary side of the transformer in the prior art may be exempted. As such, the magnetic saturation effect may not occur in the transformer and thus a DC block capacitor may not be required at the primary side of the transformer in this invention.

What is claimed is:

1. An inverter to convert DC power into AC for driving a load, comprising:
    a DC power source having a supply terminal to supply a DC current and a return terminal to return the same;
    a resonance transformer having a primary winding and a secondary winding, wherein the primary winding has a first end terminal, a second end terminal, and a center tap terminal; the secondary winding having a first output terminal and a second output terminal for connecting the load thereacross;
    a first switch having a first terminal, a second terminal, and a control terminal connectable to a control signal actuating a connection or disconnection status between the first and second terminals, wherein the first terminal connects to the supply terminal and the second terminal connects to the center tap terminal;
    a second switch having a first terminal, a second terminal, and a control terminal connectable to a control signal actuating the connection or disconnection status of the first and second terminals, wherein the first terminal connects to the return terminal and the second terminal connects to the first end terminal;
    a third switch having a first terminal, a second terminal, and a control terminal connectable to a control signal actuating the connection or disconnection status of the first and second terminals, wherein the first terminal connects to the return terminal and the second terminal connects to the second end terminal;
    a controller unit providing a common controlling signal for generating the three control signals to selectively control in concurrent manner the first, second, and third switches responsive thereto, whereby the first, second, and third switches are actuated to selective combinations of connection and disconnection states.

2. The inverter device as recited in claim 1, wherein each of the first, second and third switches includes a diode connected across first and second terminals thereof to bypass a reactive fly-back current from the primary winding flowing in a direction opposite to the said DC current.

3. The inverter device as recited in claim 1, wherein the controller unit comprises:
    a PWM signal for controlling the first switch;
    a flip-flop having a plurality of status output terminals providing corresponding status signals at complementary logic levels, and a control input terminal which receives the PWM signal for toggling the logic status of the status signals; and
    a logic circuit having a plurality of transfer channels each having an input receiving a status signal, an output controlling one of the second and third switches, and a gating control common to both channels for receiving the PWM signal to enable or disable the transfer channels.

4. The inverter device as recited in claim 3, wherein the logic circuit includes a plurality of two-input NAND gates.

5. The inverter device as recited in claim 3, wherein the logic circuit includes a plurality of two-input AND gates.

6. The inverter device as recited in claim 3, wherein the PWM signal controls the first switch through an inverting buffer.

* * * * *